May 23, 1933.  F. SODDY  1,910,777
EPICYCLIC GEARING
Filed Jan. 27, 1932   2 Sheets-Sheet 1

F. Soddy
INVENTOR

By: Marks & Clerk
Attys.

May 23, 1933.  F. SODDY  1,910,777
EPICYCLIC GEARING
Filed Jan. 27, 1932  2 Sheets-Sheet 2
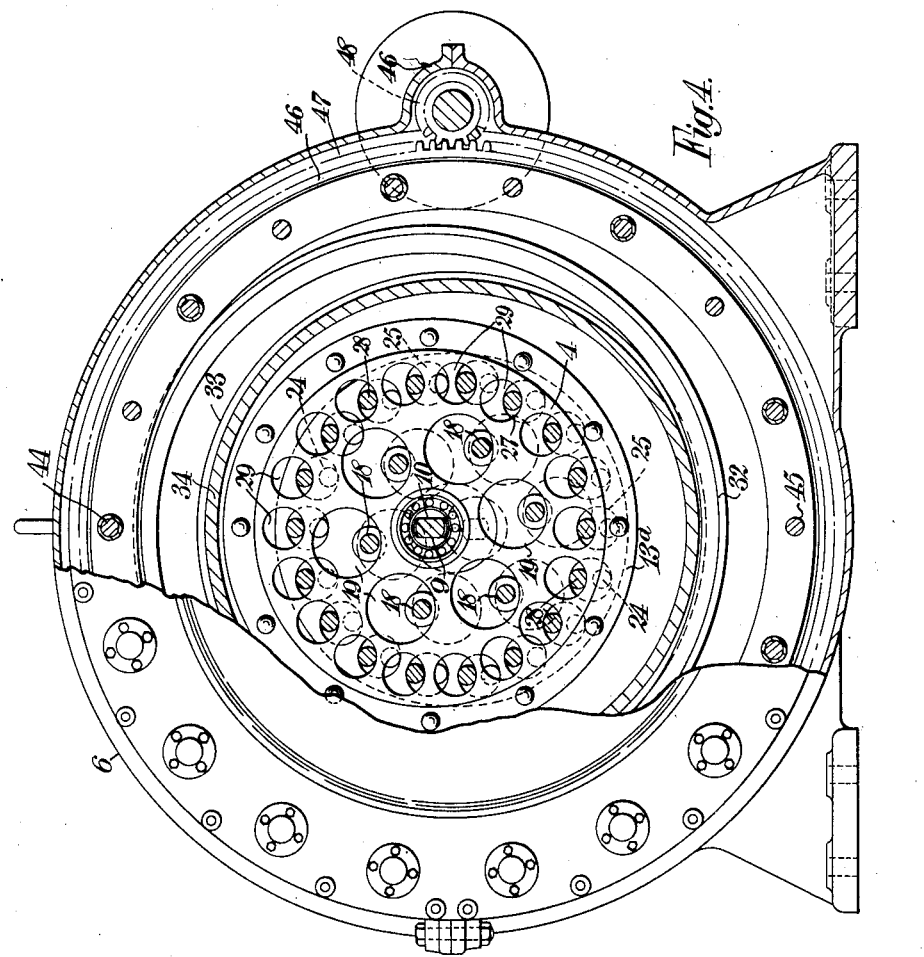
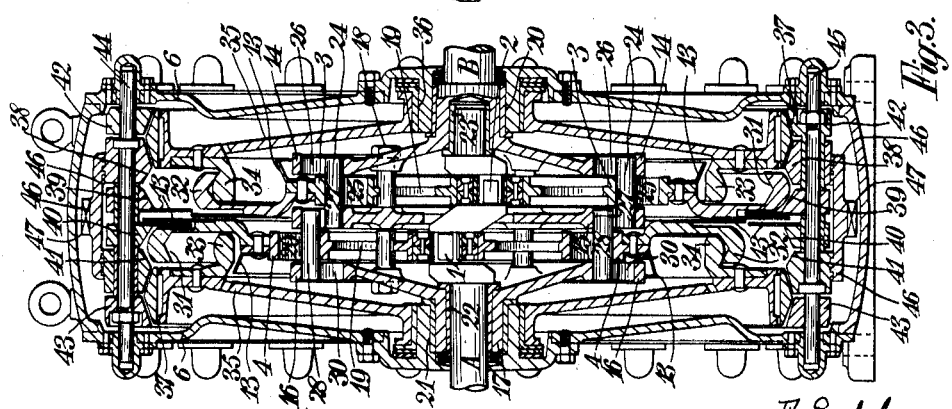
F. Soddy
INVENTOR
By: Marks & Clerk
ATTYS.

Patented May 23, 1933

1,910,777

UNITED STATES PATENT OFFICE

FREDERICK SODDY, OF OXFORD, ENGLAND

EPICYCLIC GEARING

Application filed January 27, 1932, Serial No. 589,240, and in Great Britain February 19, 1931.

This invention relates to the type of epicyclic gearing in which a large speed-ratio is obtained between co-axial driving and driven members by the use of a pair of co-acting gear wheels of nearly equal size.

The main object of the invention is to provide a mechanism of the type referred to capable of transmitting large powers at high speed, as wanted, for example, for steam turbines.

A further object is to provide a form of such mechanism which shall be reversible as regards the direction of rotation of the driven member relatively to the driving member without declutching either member, as wanted, for example, for marine engines.

Hitherto the very great centrifugal forces developed by the massive planets revolving at high speeds and the excessive pitch-line velocity of the meshing teeth have precluded the successful use of this type of epicyclic gearing in such applications.

With such objects:—

The invention consists broadly in the first part in an epicyclic gearing of the type indicated in which the centrifugal force of the revolving planet is exerted wholly at the point of rolling contact upon the member with which it co-acts so as to avoid the use of teeth and secure rolling substantially without slipping.

For this purpose, the planets are so mounted on the high-speed shaft as to have a slight freedom of movement in a radial direction relatively to the crankpin, in order to allow the crank throw or eccentricity to adjust itself in accordance with the wear of the rolling surfaces.

In addition, the linkage employed between the planet and the low-speed or stationary member must be such as to permit of a similar variation of eccentricty.

The invention consists in the second part in reversible forms of the mechanism, in which the planet can roll either upon an outer periphery in engagement with an annular sun member or upon an inner periphery in engagement with an inner cylindrical member.

A convenient form of construction for this purpose is one in which the two members engage with the planet at slightly different eccentricities.

To balance the mechanism, it is preferable to have more than one planet, and in the forms of the invention hereinafter described, two planets are mounted on a double-throw 180° crank on the high-speed shaft, but it is to be understood that any required number may be used.

Referring now to the accompanying drawings—

Figure 1:
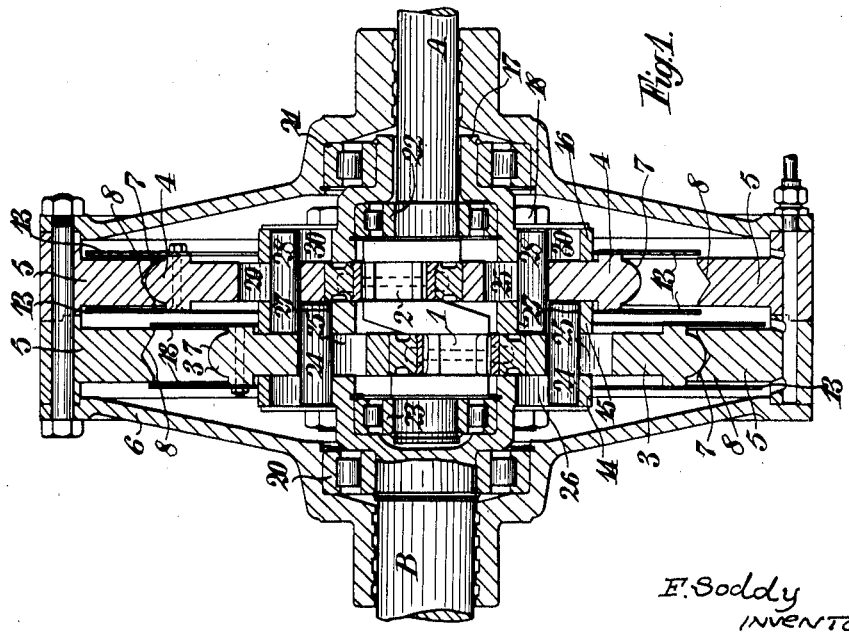

Figure 1 shows a cross-sectional elevation and

Figure 2:
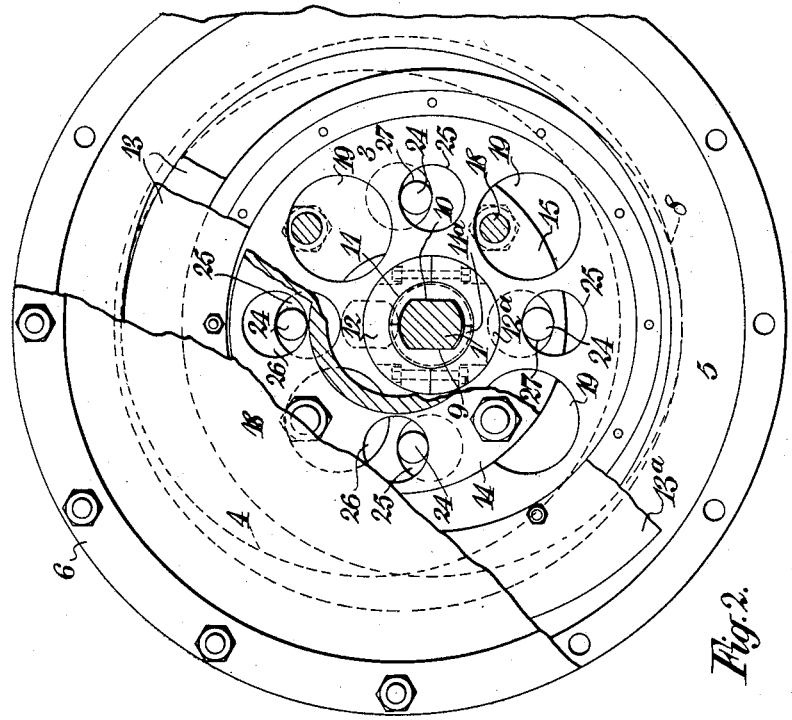

Figure 2 an end view with parts removed, of one form of the invention in which the planets are the cylindrical members and the annular members are fixed to the casing of the machine; while Figure 3 shows a cross-sectional elevation and Figure 4 an end elevation partly in section, of a reversing form of the invention designed to give in addition to forward and reverse speeds a neutral position in which the driving member does not actuate the driven member.

In carrying the invention into effect according to one form (see Figures 1 and 2) the high-speed shaft, A, is provided with two oppositely-disposed crankpins, 1 and 2, on which are rotatably mounted planets, 3, 4, engaging with annular members, 5, mounted in the casing, 6.

The planets, 3 and 4, are capable of a certain amount of radial movement relatively to the axes of the crankpins, 1, 2, so that in motion they are thrown out centrifugally and their rounded rims, 7, are pressed against the doubly conical internal surfaces, 8, of the annular members, 5. For this purpose the crankpins are provided with flats, 9, 10, (see Figure 2) parallel to the plane containing the crankshaft and crankpin axes. Each crankpin co-acts with a split bush, 11, 11a, the halves of which have corresponding flats, these bushes having slight radial freedom of movement relatively to the crankpins. Between each bush and its planet is a second split bush, having halves, 12, 12a, and rotatable relatively to the bush, 11, 11a, and to the planets, 3, 4.

Oil throwers, 13, are provided as shown on the planets, 3, 4, to enclose the members, 5, in the event of it being necessary to deflect oil from the rolling surfaces.

The low-speed shaft, B, is provided with a disc, 14, secured to a disc, 15, between the planets, and to a disc, 16, with a tubular extension, 17, by a ring of bolts, 18, which pass through clearance holes, 19, in the planets (see Figure 2) of radius greater than the maximum eccentricity of the cranks plus the radius of the bolts. The discs, 14, 15 and 16, with the shaft, B, constitute a rigid frame, which will be termed the low-speed frame, within which the planets, 3, 4, are free to execute their planetary or revolutionary motion without rotation relatively to the frame and without touching the bolts, 18.

The low-speed frame is mounted at each end on suitable bearings, 20 and 21, in the casing, the bearing, 20, supporting the low-speed shaft, B, and the bearing, 21, supporting the tubular extension, 17, of the disc, 16.

The high-speed shaft, A, is mounted within the low-speed frame at each end in suitable bearings, 22 and 23, the bearing, 22, supporting the high-speed shaft in disc, 16, and the bearing, 23, supporting the end of the high-speed shaft in disc 14.

The low-speed frame is linked to the planets, 3, 4, so as to cause them to rotate at the same speed by rings of holes, in corresponding positions in the planets and in the three discs of the low-speed frame, by means of rollers. The rollers, 24, link the holes, 25, in the planet, 3, to the holes, 26, in the disc, 14, and the holes, 27, in the disc, 15. The rollers, 28, link the holes, 29, in planet, 4, to the holes, 27, in disc, 15, and the holes, 30, in disc, 16. The radius of each of the holes, 26, 25, 27, 29 and 30, is one-half the maximum eccentricity of a planet plus the radius of a roller.

In action, the rollers, 24, 28, roll round the inner periphery of the holes in the members they link together with a planetary motion of the same speed as the planets but at half the eccentricity, and the linkage is effected without sliding surfaces.

In transmitting the torque between the planet and the low-speed shaft, most of the rollers at any instant are ineffective, the load being taken the more effectively by those on one or other side of the ring, according to the direction of rotation, which are most nearly in the position at right angles to the line of the crank. For this reason, the number of rollers in the ring should be as great as the design allows, four being the minimum for smooth and efficient working. For example, in the position of the mechanism shown in Figure 2, only one roller, 24, is driving and it is at its most favourable position, the roller opposite is following, and the two in the line of the crank are at their dead points changing from driving to following and vice versa.

For eccentricities less than the maximum, as given by the difference between the diameter of the holes and the rollers, the driven member lags behind the driver and its rotation becomes non-uniform with respect to that of the drive, much in the same way as for two shafts connected at an angle by a Hooke's joint. This non-uniformity is the less important the nearer the eccentricity is to the maximum and the larger the number of rollers in the ring. For the purposes of this invention, requiring only slight changes of eccentricity, it may be made negligible by suitable design.

Alternatively to the pure rolling linkage just described, I may in certain cases link the planets by a simpler construction depending upon the known principle of providing them with holes which engage with pins on the low-speed or stationary member, by way of tubular rollers which rotate on the pins.

Thus, for example, referring to Figures 1 and 2, the rollers, 24, 28, may be dispensed with, and also the holes, 25, 29, in planets, 3, 4, and the holes 26, 27 and 30, in discs, 14, 15 and 16. Instead of the parts so omitted, the bolts, 18, where they pass through the planets, 3, 4, may be furnished with rollers which engage with the holes, 19, in the planets. These holes, 19, are, in this alternative construction, of radius equal to the external radius of the rollers plus the maximum eccentricity.

The form of mechanism shown in Figures 1 and 2 can be used either with the casing or with the shaft, B, held stationary.

Assuming that the casing is stationary and that, A, is the driving shaft, the planets revolve at the speed of the shaft, A, while the driven shaft, B, and the planets make one rotation in the same time. The rotation of the shaft, B, is opposite to that of the shaft, A, and bears the same ratio to it as the crank throw or eccentricity bears to the radius of the planet.

If the shaft, B, is held stationary and the casing allowed to rotate, it does so in the same direction as the shaft, A, at a speed which bears the same ratio to it as the eccentricity bears to the radius of the annular member, 5.

If the planets are provided with internal instead of external rims, engaging with inner cylindrical members fastened to the casing, and if the latter is stationary, the shaft, B, rotates in the same direction as the shaft, A, at a speed ratio equal to the ratio between the eccentricity and the radius of the inner periphery of the planet. If the shaft, B, is stationary, the casing rotates in the direction opposite to that of the shaft, A, at a speed ratio equal to the ratio of the eccentricity to the radius of the inner cylindrical member.

Referring now to Figures 3 and 4, which represent a reversing reduction gear on the same principle designed for marine propulsion, the planets, 3, 4, are mounted on the high-speed shaft, A, in the same way as in Figures 1 and 2, the construction of the low-speed frame attached to the shaft, B, the mounting of the high-speed shaft, A, in bearings in this frame, and of the frame in bearings in the casing being also the same or similar.

The three discs, 14, 15 and 16, of the low-speed frame, are made larger and have an inner ring of bolts, 18, and an outer ring of holes, 26, 27 and 30. The planets, 3, 4, have similarly an inner ring of clearance holes, 19, and an outer ring of holes, 25 and 29. The planets, 3, 4, are further modified by the provision of an internal periphery of doubly conical form, 31, and an externally-rounded surface, 32. The inner peripheries, 31, of the planets, roll on the rounded external periphery, 33, of rings, 34, fastened to disc-like members, 35, which are rotatably mounted in bearings, 36, in the casing, 6, and carry doubly-conical brake drums, 37.

The annular tracks on which the rounded surfaces, 32, of the planets can also roll, are formed of the four annular members, 38, 39, 40, 41. The two inner members, 39, 40, are singly conical, and each forms the inner half of one of the annular tracks engaging with the planets, 3, and 4, respectively. The two outer, 38, 41, are double conical, the inner parts forming the other halves of the annular tracks on which the planets roll, and the outer halves forming brakes for the inner conical surfaces of the brake drums, 37. On each side are two singly-conical brake rings, 42, 43, also forming brakes for the outer conical surfaces of the brake drums, 37.

Suitable oil throwers, 13, mounted on the planets, 3, 4, and on the members, 39, 40, are provided if it is necessary to deflect oil from the rolling surfaces.

The six annular members, 43, 41, 40, 39, 38 and 42, are fastened together by alternate spindles, 44 and 45, into two sets of alternate members, 43, 40, 38, by the spindles, 44, and 41, 39, 42, by the spindles, 45, so that the two sets can move axially relatively to each other. One member of each set, 41, 38, is provided with an external thread, the threads being right- and left-handed, and these threads engage with corresponding threads in a screwed collar, 46, which carries external teeth, 47, meshing with a pinion, 48, (Figure 4) mounted on one side of the casing, and actuated by any suitable means. The continuous movement of the pinion, 48, controls the gear, causing it if moved in one direction to change from ahead to neutral and from neutral to astern, and vice versa if moved in the other direction.

In explanation of this method of reversing, it will be supposed first that the control is moved from the neutral position to give the ahead speed.

In the neutral position, the planet is rolling on its inner periphery, 31, upon the outer periphery, 33, of the member, 34, which is free to rotate. On moving the control to the ahead position, the set of annular members, 42, 39, 41, are moved axially to the left and the set, 38, 40, 43, to the right. The pairs, 42 and 38, and 41 and 43, engage the brake blocks, 37, and hold the members, 35, at rest, giving the ahead speed. On moving the control in the opposite direction, the brakes are freed, giving first the neutral position, and the members, 38 and 39, and the members, 40 and 41, then approach each other respectively till they engage the planets, 3 and 4, respectively, and cause them first to rub and then to roll upon their outer peripheries, 32, giving the astern speed. This operation somewhat reduces the eccentricity of the planets and causes the inner peripheries, 31, of the planets, to run clear of the outer peripheries, 33, of the members, 35, which then come to rest.

If the diameters of the inner, 31, and outer, 32, peripheries of the planets were equal, the ahead and astern speeds would be equal and opposite and would bear to the speed of the shaft, A, the same ratio as twice the eccentricity bears to this diameter. In practice the astern speed is somewhat less than the ahead speed, both by reason of the thickness of the rim of the planets and of the slight difference of eccentricity at the two speeds.

It will be understood that, in order to satisfy the very widely different requirements as regards speed, speed-ratio and other working conditions under which the invention may be used, the form and construction of the component elements of the mechanisms described can be varied to a large extent without changing their kinematic relation and that the scope of the present invention is wide enough to include all such variations.

Having now described my invention, what I claim as new and desire to secure by Letters Patent is:—

1. Epicyclic gearing consisting of a first rotatable member, a plurality of pairs of co-acting friction wheels of each of which pairs at least one wheel is annular, one of said friction wheels of each of said pairs being co-axial with said first member and the other wheel taking the form of a planet freely mounted on said first member to revolve with it at a variable eccentricity as determined only by the difference of radii of the pair and held in rolling relation with it by its centrifugal force being exerted wholly at the point of rolling contact without producing deformation of the other parts of the mechanism, said planets being so spaced apart angularly on said first member that the centrifugal forces they exert on said co-acting wheels oppose and neutralize one another, a second member alined with said first rotatable member, and links between said second member and said planets causing them to rotate together, if at all, on their parallel axes while permitting the distance between said axes to vary until it becomes equal to the difference of radii of the pair of co-acting wheels.

2. Epicyclic gearing as claimed in claim 1, in which said second member is provided with a plurality of pairs of rolling surfaces, one of which is an inner and the other an outer driving surface, and in which each said planet wheel is provided with corresponding outer and inner surfaces; together with means for rendering corresponding pairs of co-acting surfaces operative at will.

3. Epicyclic gearing as claimed in claim 1, in which said second member is provided with a plurality of pairs of rolling surfaces, one of which is an inner and the other an outer driving surface, and in which each said planet wheel is provided with corresponding outer and inner surfaces; together with means for engaging at different eccentricities each said planet wheel with said outer and inner surfaces.

4. Epicyclic gearing as claimed in claim 1, in which said second member comprises a plurality of pairs of circular parts, one of which is provided with an inner and the other with an outer driving surface, and in which each said planet wheel is provided with corresponding outer and inner surfaces; together with means for rendering corresponding pairs of co-acting surfaces operative at will, said means including means for moving in an axial direction one of said circular parts.

5. Epicyclic gearing as claimed in claim 1, in which said second member comprises a plurality of pairs of circular parts, one of which is provided with an inner and the other with an outer driving surface, and in which each said planet wheel is provided with corresponding outer and inner surfaces; together with means for braking at least one of said circular parts.

In testimony whereof I have signed my name to this specification.

FREDERICK SODDY.